US006590441B2

(12) United States Patent
Papathanasiou

(10) Patent No.: US 6,590,441 B2
(45) Date of Patent: Jul. 8, 2003

(54) SYSTEM AND METHOD FOR TUNING A VLSI CIRCUIT

(75) Inventor: Kostas Papathanasiou, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/872,844

(22) Filed: Jun. 1, 2001

(65) Prior Publication Data

US 2002/0180512 A1 Dec. 5, 2002

(51) Int. Cl.[7] .................................................. H02J 3/38
(52) U.S. Cl. ....................................... 327/530; 327/562
(58) Field of Search ................................ 327/530, 551, 327/560, 561, 562, 99

(56) References Cited

U.S. PATENT DOCUMENTS 4,731,664 A * 3/1988 Nishiwaki et al. .......... 365/222
5,568,637 A * 10/1996 Moriya ...................... 712/229
5,621,407 A * 4/1997 Jeong et al. ................ 341/143
6,294,949 B1 * 9/2001 Kojima et al. .............. 341/143
6,300,822 B1 * 10/2001 Cardanha et al. ........... 712/229
6,407,619 B1 * 6/2002 Tanaka ....................... 365/222

* cited by examiner

*Primary Examiner*—Timothy P. Callahan
*Assistant Examiner*—Cassandra Cox
(74) *Attorney, Agent, or Firm*—Philip R. Wadsworth; Charles D. Brown; Nicholas J. Pauley

(57) ABSTRACT

A circuit (100) for accurately tuning the absolute values of multiple parameters in a VLSI circuit by reusing a single external resistor. In the illustrative embodiment, the invention includes a first circuit (10) for generating an accurate transconductance using a single external resistor; a second circuit (20) for generating an accurate current reference using the same external resistor; and a switching circuit (60) for alternately switching on and off the first and second circuits in order to share the external resistor. The switching circuit (60) includes several switches controlled by a digital counter for turning off portions of the circuit which are not in use. In the illustrative embodiment, the invention further includes a third circuit (40) for generating one or more additional accurate reference signals. The third circuit can generate an accurate internal resistance $R_{int}$, an accurate drain to source resistance of a transistor $r_{DS}$, and/or an accurate internal capacitance $C_{int}$.

21 Claims, 4 Drawing Sheets

SYSTEM AND METHOD FOR TUNING A VLSI CIRCUIT

BACKGROUND OF THE INVENTION

1. Field of the Invention

The present invention relates to electronic circuits and systems. More specifically, the present invention relates to electronic circuits and systems for generating accurate currents and voltages in integrated circuits.

2. Description of the Related Art

Accurate voltage, current and other references are needed in modern analog integrated circuit design. Currently, voltage is the only parameter that can be accurately generated on an integrated circuit chip. Other parameters, such as current, resistance, and capacitance, cannot currently be controlled more accurately than ±15–40% unless a special process of trimming is used. For this reason, circuits are typically designed to exploit ratios of currents, capacitors and/or resistances. If an absolute value is required (other than for voltage), it will usually have to be supplied through external pins on the circuit board. Unfortunately, this is not cost effective and increases the complexity of the circuit.

Accurate transconductance is often required in analog circuits. Transconductance ($g_m$) is the ratio of the output current to the input voltage. Currently, a constant $g_m$ bias circuit can be used to generate an accurate transconductance (with an accuracy of ±1% or better), through the use of a single external resistor. The circuit uses an added pin and makes the application board more complicated. However, this is typically perceived to be a small price to pay for accurate control of $g_m$. After the transconductance of one transistor is defined, it is possible to control the transconductance of all transistors by the use of transistor and current ratios, which can be accurately controlled in VLSI. Consequently, most analog circuits include a constant $g_m$ bias circuit.

Some analog circuits also require an accurate current source, in addition to accurate transconductance, for such applications such as sensing, measurement, power control, and high frequency-low voltage. Currently, there is no way to generate an accurate current source without adding additional external devices, which add cost and complexity.

Furthermore, some circuits also require other accurate parameters, such as resistance or capacitance. Currently, there is no known way to accurately generate any parameters, other than voltage, without adding additional external devices, trimming or special processes.

Hence, a need remains in the art for an improved analog integrated circuit design offering multiple accurate reference sources in a cost-effective manner.

SUMMARY OF THE INVENTION

The need in the art is addressed by the present invention, which in a most general description provides a first circuit for generating a first accurate reference signal and a second circuit for generating a second accurate reference signal. The first and second circuits are disposed on a common substrate. A third mechanism is provided for alternately periodically coupling the first or second circuits to an external (off-substrate) device for providing an accurate reference signal.

In a specific embodiment, the invention provides a circuit for accurately tuning the absolute values of multiple parameters, such as current, transconductance, resistance, and/or capacitance, in a VLSI system with minimal changes to existing transconductance bias circuits by reusing an single external resistor.

In an illustrative embodiment, the invention includes a first circuit for generating an accurate transconductance using a single external resistor $R_{ext}$; a second circuit for generating an accurate current reference using the same external resistor $R_{ext}$; and a third circuit for alternately switching on and off the first and second circuits in order to share the external resistor $R_{ext}$.

In the illustrative embodiment, the first circuit includes four transistors $M1_G$, M2, $M3_G$, and $M4_G$ and an external resistor $R_{ext}$ connected as a constant transconductance bias circuit. The gate of $M3_G$ is connected to the gate of $M4_G$ by a switch $S_G4$, the gate of $M1_G$ is connected to the gate of M2 by a switch $S_G2$, and the source of $M3_G$ is connected to the source of $M4_G$ by two switches $S_G1$ and $S_G3$. These switches are turned on when tuning the transconductance, and turned off otherwise. The gate of $M4_G$ is connected to a capacitor C2, which is used to hold the bias voltage of the transconductance circuit while the circuit is allocated to another task.

The second circuit includes four transistors $M1_I$, M2, $M3_I$, and $M4_I$ and the external resistor $R_{ext}$ connected as a constant transconductance bias circuit, with one modification: the source of $M1_I$ is connected to a voltage source $V_{ref}$. This voltage source can be supplied accurately on chip by a bandgap voltage reference. This circuit generates a current given by $I=V_{ref}/R_{ext}$. Since both quantities $V_{ref}$ and $R_{ext}$ are defined accurately, the current will also be known accurately. Switches are connected in a similar fashion as in the first circuit. These switches are turned on when tuning the current, and turned off otherwise. The gate of $M4_I$ is connected to a capacitor C1 which is used to hold the bias voltage of the current circuit while the circuit is allocated to another task.

In a specific embodiment, the third circuit includes several switches controlled by a digital counter for turning off portions of the circuit which are not in use. In the illustrative embodiment, the invention further includes a fourth circuit for generating an additional accurate reference parameter. The fourth circuit can generate an accurate internal resistance $R_{int}$, an accurate $r_{DS}$, and/or an accurate internal capacitance $C_{int}$.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Currently, most analog circuits need an accurate transconductance $g_m$ reference. A constant $g_m$ bias circuit 10 such as that shown in FIG. 1 is typically used to fulfill this need.

Figure 1:
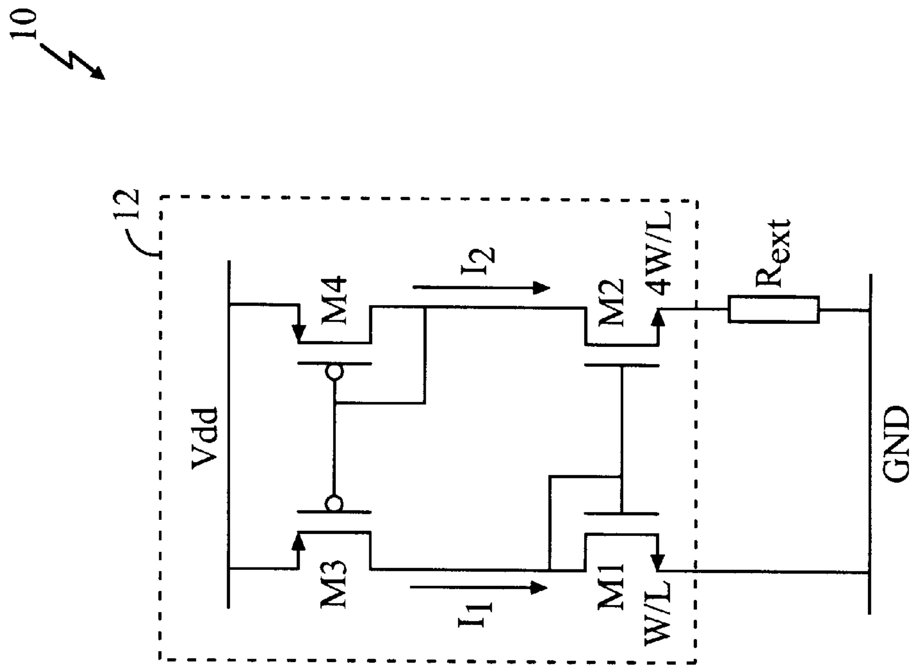
(PRIOR ART) FIG. 1
FIG. 1 is a simplified schematic diagram of a typical constant transconductance $g_m$ bias circuit of conventional design and construction.

FIG. 1 is a simplified schematic diagram of a typical constant transconductance $g_m$ bias circuit of conventional design and construction. This circuit uses an external resistor $R_{ext}$, which can have an accuracy of ±1% or better, to set up a current through a transistor M2 such that the transconductance of the transistor has an accuracy similar to that of the external resistor.

The $g_m$ bias circuit is comprised of four transistors M1, M2, M3, and M4 connected to the external resistor $R_{ext}$. The transistors M1 and M4 are connected as diodes. The drain of M1 connected to the drain of M3, the drain of M2 connected to the drain of M4, the source of M3 and the source of M4 connected to a voltage source Vdd, the source of M2 connected to one terminal of the external resistor $R_{ext}$, and the source of M1 and the other terminal of $R_{ext}$ connected to ground. The transistor M2 is four times larger than M1. The transistors M3 and M4 are identical and connected as a current mirror, ensuring that $I_1=I_2$. Assuming that these two transistors are in saturation yields:

$$V_{eff1}=\sqrt{4}\ V_{eff2} \quad [1]$$

$$V_{GS1}-V_T=2(V_{GS2}-V_T) \quad [2]$$

$$V_{GS1}=2V_{GS2}-V_T \quad [3]$$

where $V_{GS1}$ is the gate to source voltage of $M_i$, $V_{effi}=V_{GSi-VT}$, and $V_T$ is the threshold voltage of the transistors. Analyzing the loop consisting of M1, M2, and $R_{ext}$ and substituting for $V_{GS1}$ results in the following equations:

$$V_{GSi}=V_{GS2}+I_2R_{ext} \quad [4]$$

$$2V_{GS2}-V_T=V_{GS2}+I_2R_{ext} \quad [5]$$

$$V_{GS2}-V_T=I_2R_{ext} \quad [6]$$

$$V_{eff2}=I_2R_{ext} \quad [7]$$

$$g_m=I_2/V_{eff2}=1/R_{ext} \quad [8]$$

Thus, the transconductance $g_m$ of M2 is dependent only on $R_{ext}$, and will have a tolerance equivalent to that of $R_{ext}$ (±1%). Once the transconductance of one transistor is defined, it is possible to control the transconductance of all transistors by the use of transistor and current ratios, which can be accurately controlled in VLSI.

Several applications, such as sensing, measurement, power control, and high frequency-low voltage, require an accurate current reference.

Figure 2:
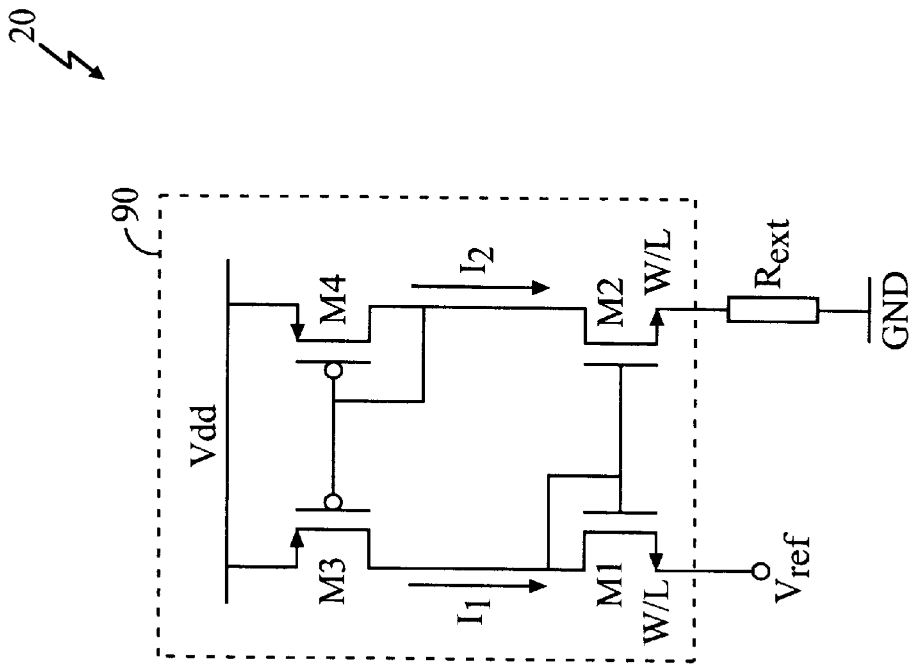
FIG. 2 is a simplified schematic diagram of a $g_m$ bias circuit modified to generate an accurate current reference in accordance with the teachings of the present invention.

FIG. 2 is a simplified schematic diagram of a circuit 20 for generating an accurate current reference by a simple modification of the $g_m$ bias circuit of FIG. 1 in accordance with the teachings of the present invention.

This circuit 20 is identical to the $g_m$ bias circuit 10 of FIG. 1 with a few modifications; the transistors M1 and M2 are now identical; and the source of M1 is fixed at a reference voltage as $V_{ref}$, which can be generated accurately on chip by a bandgap voltage source. Since the same gate voltage is applied to M1 and M2, and M1 and M2 have the same geometries, the source voltage of M2 is forced to also be $V_{ref}$. The current $I_R$ through the external resistor $R_{ext}$ is therefore well defined (since both $V_{ref}$ and $R_{ext}$ are accurate):

$$I_R=I_2=V_{ref}/R_{ext}, \quad [9]$$

and therefore the current trough M3 is also well defined (since $I_1=I_2$). This current $I_1$ can then be mirrored to serve as a current reference.

Figure 3:
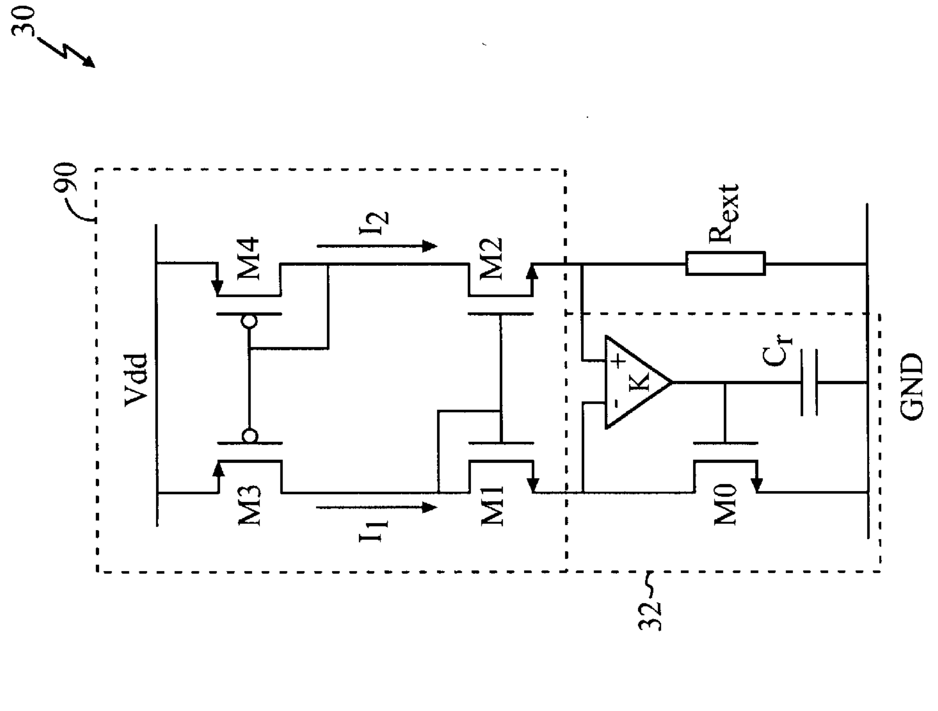
FIG. 3 is a simplified schematic diagram of a $g_m$ bias circuit modified to generate an accurate drain to source resistance $r_{DS}$ in a transistor M0 in accordance with the teachings of the present invention.

FIG. 3 is a simplified schematic diagram of a modified $g_m$ bias circuit 30 used to generate an accurate drain to source resistance $r_{DS}$ in a transistor $M_0$ in accordance with the teachings of the present invention. An accurate $r_{DS}$ is useful in many applications, such as sensors or for controlling the common-mode of a $g_m$C filter.

This circuit 30 is identical to the accurate current source circuit 20 of FIG. 2 with a few modifications: an additional transistor M0 replaces the voltage source $V_{ref}$ at the source of M1; and an op-amp K senses the voltages at the source of M1 and the source of M2, and adjusts the gate of M0 accordingly, so that the source voltages of M1 and M2 will be equal. The $r_{DS}$ of M0 is thus forced to be equal to $R_{ext}$:

$$r_{DS}=R_{ext} \quad [10]$$

A capacitor $C_r$ is also connected to the gate of M0 for stability.

In practice, the resistors inside a chip may be expected to have an accuracy of ±20%, or worse.

Figure 4:
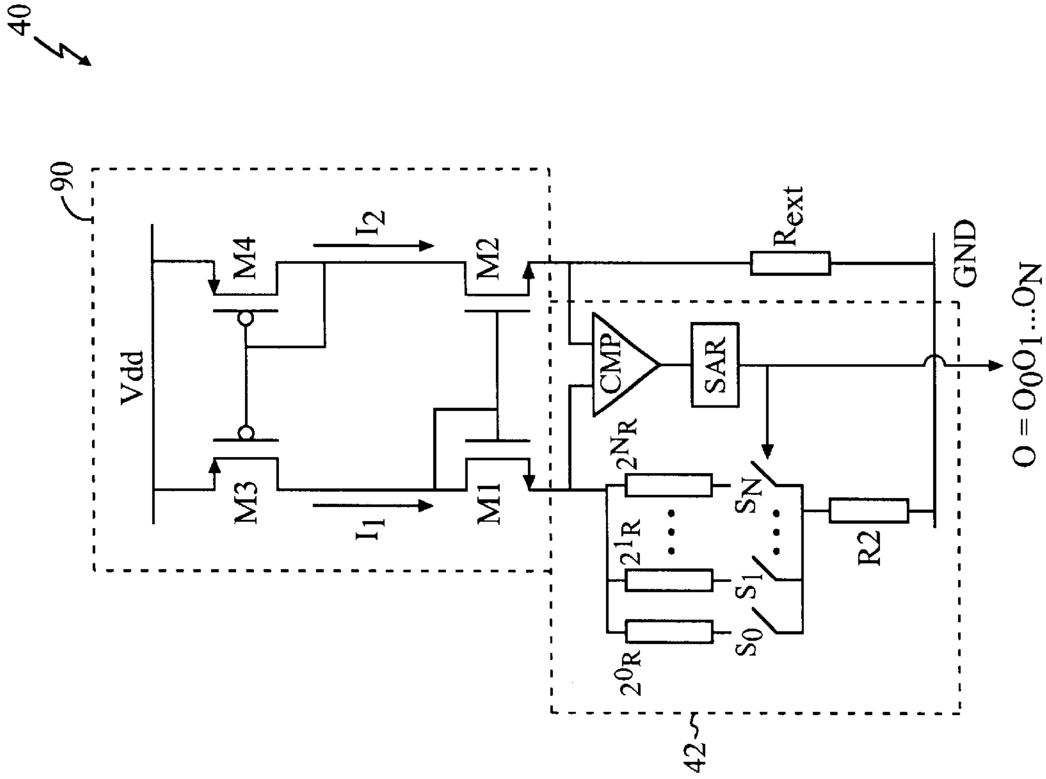
FIG. 4 is a simplified schematic diagram of a $g_m$ bias circuit modified to generate an accurate internal resistance $R_{int}$ in accordance with the teachings of the present invention.

FIG. 4 is a simplified schematic diagram of a modified $g_m$ bias circuit 40 used to generate an accurate internal resistance $R_{int}$ in accordance with the teachings of the present invention. This circuit matches an internal resistance $R_{int}$ to the external resistor $R_{ext}$, which typically has a tolerance of ±1%. An accurate resistance is useful in applications such as A/D converters.

This circuit 40 is identical to the accurate current source circuit 20 of FIG. 2 with a few modifications. For example, the source of M1, instead of the voltage source $V_{ref}$, is connected to an array of binary weighted resistors ($2^0$R, $2^1$R . . . $2^N$R), in series with a resistor R2 which is chosen to be equal to $R_{ext}$–20%, so that R2 is certain to be less than $R_{ext}$. This forms the internal resistance $R_{int}$. The resistors in the array are connected to switches ($S_0$, $S_1$ . . . $S_N$), which are controlled by a successive approximation register (SAR). A comparator (CMP) compares the internal resistance $R_{int}$ with $R_{ext}$, and tells the SAR whether to increase or decrease the internal resistance. The SAR successively switches the resistors in the array on and off until the total internal resistance matches $R_{ext}$:

$$R_{int}=R_{ext} \quad [11]$$

This resistance can then be copied elsewhere in the circuit by simply taking the sequence for the switches ($O=O_0O_1$ . . . $O_N$) from the SAR and applying it to similar arrays of resistors.

Figure 5:
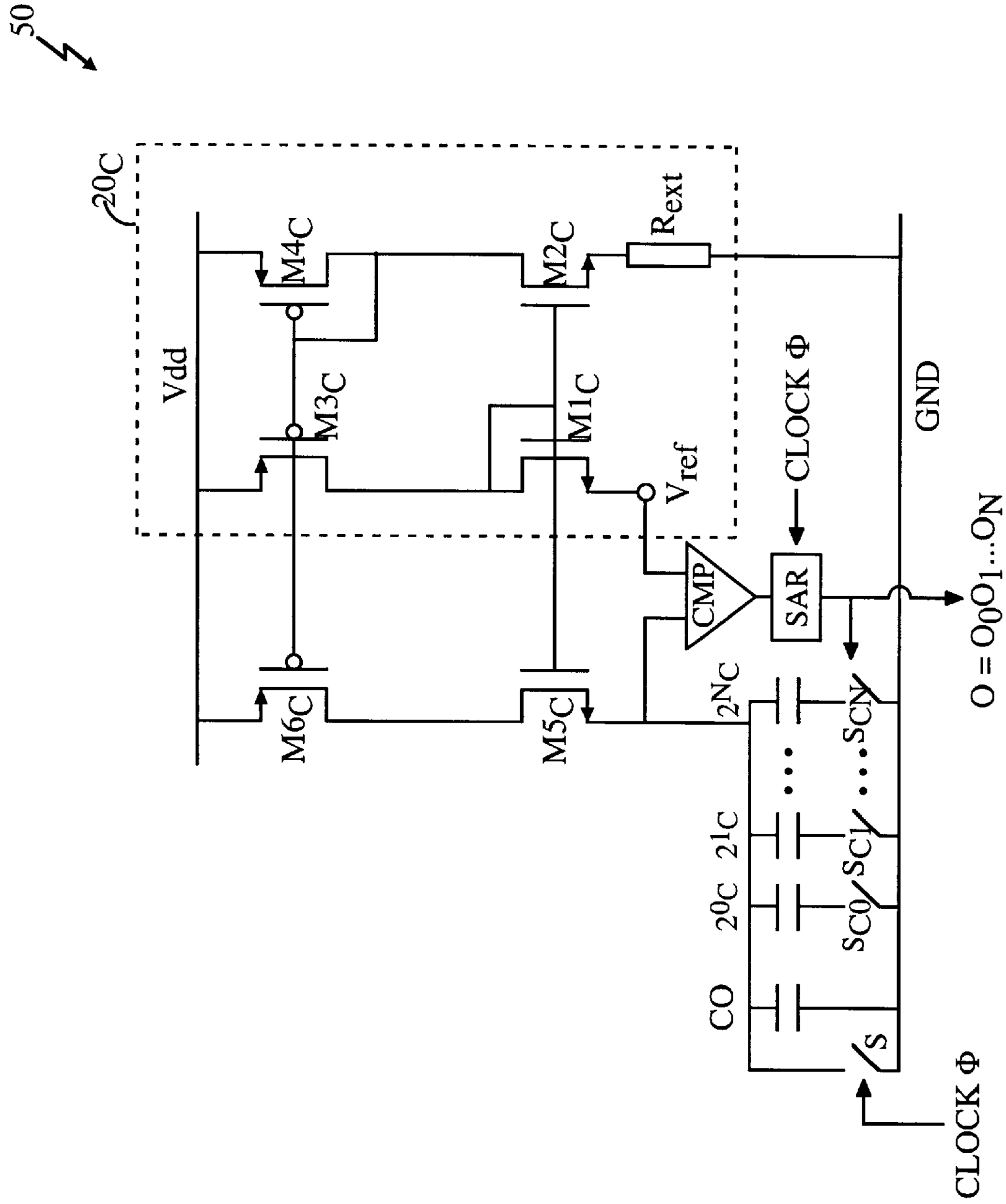
FIG. 5 is a simplified schematic diagram of a $g_m$ bias circuit modified to generate an accurate internal capacitance $C_{int}$ in accordance with the teachings of the present invention.

FIG. 5 is a simplified schematic diagram of a modified $g_m$ bias circuit 50 used to generate an accurate internal capacitance $C_{int}$ in accordance with the teachings of the present invention. This is useful for low power consumption circuits. This circuit includes the circuit 20$_C$, which is electrically equivalent to circuit 20 of FIG. 2, plus two additional transistors $M5_C$ and $M6_C$. The gate of transistor $M5_C$ is connected to the gate of transistor $M1_C$ (in circuit 20$_C$), and the gate of transistor $M6_C$ is connected to the gate of transistor $M2_C$ (in circuit 20$_C$). The drains of transistors $M5_C$ and $M6_C$ are connected to each other. The source of transistor $M6_C$ is connected to Vdd. The source of transistor $M5_C$ is connected to an array of binary weighted capacitors ($2^0C$, $2^1C$ . . . $2^NC$) each connected in parallel with a capacitor CO. These capacitors form the internal capacitance $C_{int}$. A switch S controlled by a clock Φ is connected in parallel to the capacitor array. The capacitors in the array are connected to switches ($S_{C0}$, $S_{C1}$ . . . $S_{CN}$), which are controlled by a successive approximation register (SAR). The SAR is controlled by the clock Φ. A comparator (CMP) compares the voltage on the capacitor array with the reference voltage $V_{ref}$ (in circuit 20), and tells the SAR whether to increase or decrease the internal capacitance. This capacitance can then be copied elsewhere in the circuit by simply raking the sequence for the switches ($O=O_0O_1 \ldots O_N$) from the SAR and applying it to similar arrays of capacitors.

In the circuit 50 of FIG. 5, the circuit 20 is used to generate a constant current which is dumped on the capacitor array for a given interval defined by the duration of the low time of the reset clock Φbar (with a well defined duration ΔT which derives from an accurate crystal oscillator). The final value of the voltage on the capacitor is compared to a reference voltage while the successive approximation algorithm is used to tune the capacitor to the desired value:

$$C_{int}=\Delta T^{*}I_{ref}/V_{ref} \quad [12]$$

where $I_{ref}$ is the current at $V_{ref}$.

More circuits can be generated in a similar fashion to control other parameters.

Finally, several circuits can be combined to control multiple parameters at once by reusing the external resistor. Since an external device requires a pin and results in a more complicated circuit board layout, it would be highly desirable not to use more pins for tuning internal components. This can be achieved easily by the use of some switches.

Figure 6:
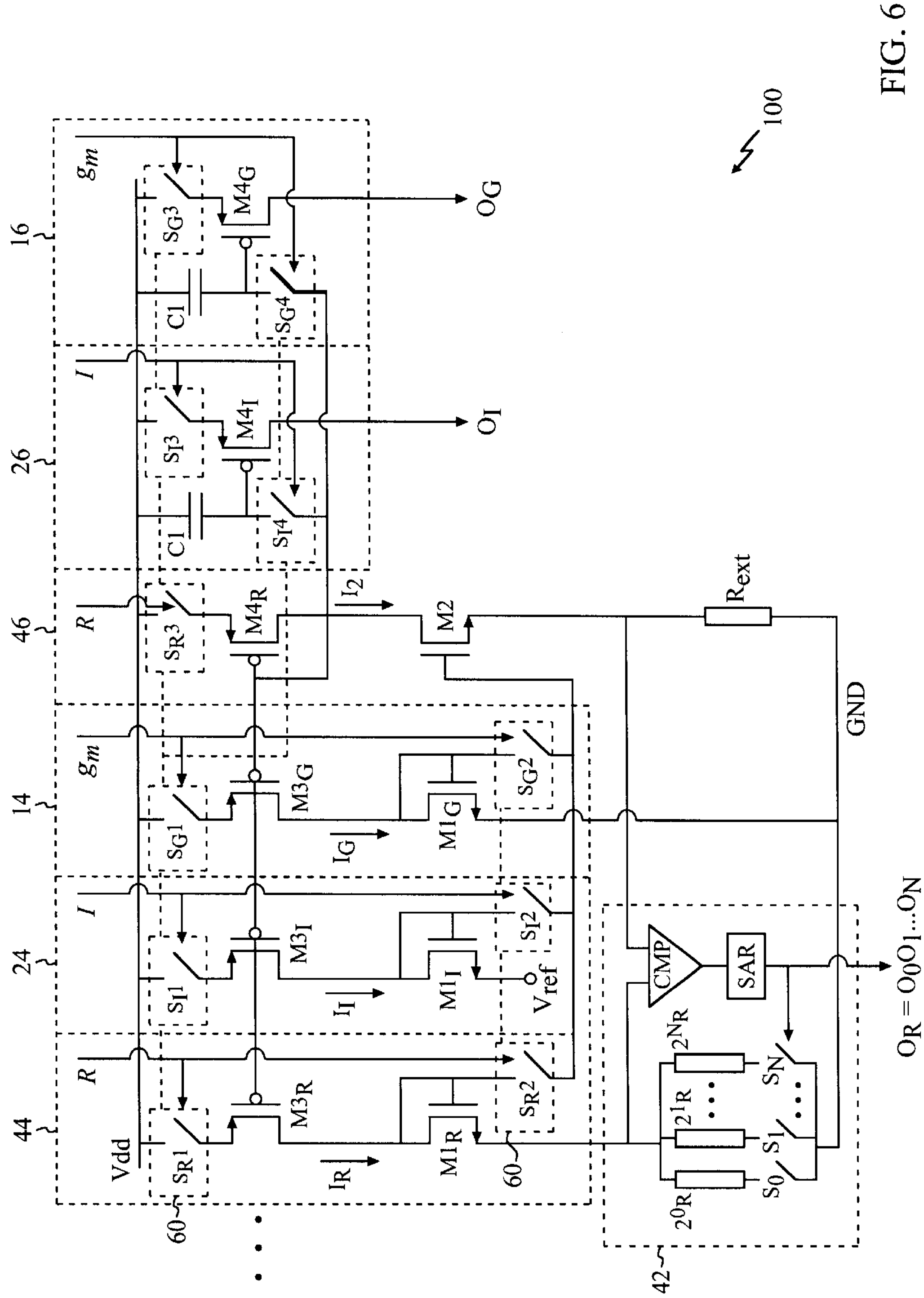
FIG. 6 is a simplified schematic diagram of a $g_m$ bias circuit modified to generate accurate transconductance, current, and internal resistance all at the same time by reusing the external resistor in accordance with the teachings of the present invention.

FIG. 6 is a simplified schematic diagram of a circuit 100 which generates accurate transconductance, current, and internal resistance all at the same time by reusing the external resistor in accordance with the teachings of the present invention. In the preferred embodiment, the circuit is disposed on a common substrate, except for the single external device, the resistor.

This circuit combines the circuits of FIG. 1, FIG. 2, and FIG. 4 with a switching circuit 60 that periodically switches to the desired reference generating circuit, turning off the portions of the circuit which are not in use. The switching circuit 60 includes several switches: $S_G$1, $S_G$2, $S_G$3, $S_G$4, $S_I$1, $S_I$2, $S_I$3, $S_I$4, $S_R$1, $S_R$2, and $S_R$3. A digital counter allocates the portion of the circuit that generates the constant $g_m$, I, or $R_{int}$ to the external resistor $R_{ext}$. The resultant bias voltages for the $g_m$ and I circuits are refreshed periodically on capacitors C1 and C2, respectively. These capacitors hold the desired bias voltage when the reference generating circuit is allocated to another task (such as fixing the R, I, or $g_m$). Outputs $O_I$ and $O_G$ provide the accurate current reference and the accurate transconductance reference current which is continuously available to other blocks of the same substrate.

Circuits 14 and 16 combine with the transistor M2 and the external resistor $R_{ext}$ to form an accurate transconductance circuit similar to that of FIG. 1 (circuit 10). This occurs when switches $S_G$1, $S_G$2, $S_G$3, and $S_G$4 are on, and all other switches are off.

Circuit 14 is comprised of a transistor $M1_G$ connected as a diode, and a transistor $M3_G$. The drain of $M1_G$ is connected to the drain of $M3_G$. The source of $M1_G$ is connected to ground. A switch $S_G$1 connects the source of $M3_G$ to Vdd. A switch $S_G$2 connects the gate of $M1_G$ to the gate of M2. Circuit 16 is comprised of a transistor $M4_G$ and a capacitor C2 connected between Vdd and the gate of $M4_G$. A switch $S_G$3 connects the source of $M4_G$ to Vdd. A switch $S_G$4 connects the gate of $M4_G$ to the gate of $M3_G$ in circuit 14.

Circuits 24 and 26 combine with the transistor M2 and the external resistor $R_{ext}$ to form an accurate current circuit similar to that of FIG. 2 (circuit 20). This occurs when switches $S_I$1, $S_I$2, $S_I$3, and $S_I$4 are on, and all other switches are off.

Circuit 24 is comprised of a transistor $M1_I$ connected as a diode, and a transistor $M3_I$. The drain of $M1_I$ is connected to the drain of $M3_I$. The source of $M1_I$ is connected to a voltage source $V_{ref}$. A switch $S_I$1 connects the source of $M3_I$ to Vdd. A switch $S_I$2 connects the gate of $M1_I$ to the gate of M2. Circuit 26 is comprised of a transistor $M4_I$ and a capacitor C1 connected between Vdd and the gate of $M4_I$. A switch $S_I$3 connects the source of $M4_I$ to Vdd. A switch $S_I$4 connects the gate of $M4_I$ to the gate of $M3_I$ in circuit 24.

Circuits 42, 44, and 46 combine with the transistor M2 and the external resistor $R_{ext}$ to form an accurate internal resistance circuit similar to that of FIG. 4 (circuit 40). This occurs when switches $S_R$1, $S_R$2, and $S_R$3 are on, and all other switches are off.

Circuit 42 is comprised of an array of binary weighted resistors ($2^0R$, $2^1R$ . . . $2^NR$). The resistors in the array are connected to ground by switches ($S_0$, $S_1$ . . . $S_N$), which are controlled by a successive approximation register (SAR). A comparator (CMP) compares the internal resistance $R_{int}$ generated by the array of resistors with $R_{ext}$ and outputs the result to the SAR. Circuit 44 is comprised of a transistor $M1_R$ connected as a diode, and a transistor $M3_R$. The drain of $M1_R$ is connected to the drain of $M3_R$. The source of $M1_R$ is connected to the array of resistors in circuit 42. A switch $S_R$1 connects the source of $M3_R$ to Vdd. A switch $S_R$2 connects the gate of $M1_R$ to the gate of M2. Circuit 46 is comprised of a transistor $M4_R$. A switch $S_R$3 connects the source of $M4_R$ to Vdd. The drain of $M4_R$ is connected to the drain of M2.

Thus, the present invention reuses the external resistor $R_{ext}$ to generate alternative biasing or tuning tasks. With very minor changes (a single transistor, a capacitor, and some switches), the inventive $g_m$ bias circuit can be used to generate an accurate current (e.g., with tolerance of ±1%). The $g_m$ bias circuit can also use the accurate external resistance to periodically tune the $r_{DS}$ of a transistor, internal resistance $R_{int}$, and/or capacitance $C_{int}$, (e.g., to an accuracy of ±1%, in comparison with typical current tolerances of ±15% to ±40%).

The present invention has been described herein with reference to a particular embodiment for a particular application. Those having ordinary skill in the art and access to the present teachings will recognize additional modifications, applications and embodiments within the scope thereof. For example, the present teachings are not limited to VLSI technology and can be used in any integrated circuit application such as LSI. Further, the external device is not limited to a resistor. The present invention may be implemented using any external reference, such as current, without departing from the scope of the present teachings.

It is therefore intended by the appended claims to cover any and all such applications, modifications and embodiments within the scope of the present invention.

What is claimed is:

1. A circuit, adaptively coupled to a common external resource, for generating multiple accurate reference signals, comprising:

a first circuit for generating a first refreshable accurate reference signal;

a second circuit for generating a second refreshable accurate reference signal;

a switching circuit coupled to each of the first and second circuits to selectively refresh the associated reference signals; and wherein the external resource is a resistor $R_{ext}$.

2. The circuit of claim 1 wherein the first accurate reference signal is transconductance.

3. The circuit of claim 2 wherein the first circuit includes four transistors $M1_G$, M2, $M3_G$, and $M4_G$ connected as a constant transconductance bias circuit: with $M1_G$ and $M4_G$ connected as diodes, the drain of $M1_G$ connected to the drain of $M3_G$, the drain of M2 connected to the drain of $M4_R$, the source of M2 connected to one terminal of the external resistor $R_{ext}$, and the source of $M1_G$ and the other terminal of $R_{ext}$ connected to ground.

4. The circuit of claim 3 wherein the gate of $M3_G$ is connected to the gate of $M4_G$ by a switch $S_G4$, the gate of $M1_G$ is connected to the gate of M2 by a switch $S_G2$, and the source of $M3_G$ is connected to the source of $M4_G$ by two switches $S_G1$ and $S_G3$.

5. The circuit of claim 4 wherein the gate of $M4_G$ is connected to a capacitor C2.

6. The circuit of claim 1 wherein the second accurate reference signal is current.

7. The circuit of claim 6 wherein the second circuit includes four transistors $M1_I$, M2, $M3_I$, and $M4_I$ connected as a constant current bias circuit: with $M1_I$ and $M4_I$ connected as diodes, the drain of $M1_I$ connected to the drain of $M3_I$, the drain of M2 connected to the drain of $M4_R$, the source of M2 connected to the external resistor $R_{ext}$, and the source of $M1_I$ connected to a voltage source $V_{ref}$.

8. The circuit of claim 7 wherein the gate of $M3_I$ is connected to the gate of $M4_I$ by a switch $S_I4$, the gate of $M1_I$ is connected to the gate of M2 by a switch $S_I2$, and the source of $M3_I$ is connected to the source of $M4_I$ by two switches $S_I$I and $S_I3$.

9. The circuit of claim 7 wherein the gate of $M4_I$ is connected to a capacitor C1 providing the means for an analog memory.

10. A biasing circuit for, adaptively coupling to a common external resource, for generating multiple accurate reference signals, comprising:

a first circuit for generating a first refreshable accurate reference signal;

a second circuit for generating a second refreshable accurate reference signal;

a switching circuit coupled to each of the first and second circuits to selectively refresh the associated reference signals; and a third circuit for generating one or more additional accurate reference signals while coupled to the same external resource.

11. The circuit of claim 10 wherein the third circuit includes a circuit for generating an accurate internal resistance $R_{int}$.

12. The circuit of claim 11 wherein the circuit includes four transistors $M1_R$, M2, $M3_R$, and $M4_R$ connected as a constant $R_{int}$ bias circuit: with $M1_R$ and $M4_R$ connected as diodes, the drain of $M1_R$ connected to the drain of $M3_R$, the drain of M2 connected to the drain of $M4_R$, the gate of $M3_R$ is connected to the gate of $M4_R$, the source of M2 connected to the external resistor $R_{ext}$, and the source of $M1_R$ connected to $R_{int}$.

13. The circuit of claim 12 where in the gate of $M1_R$ is connected to the gate of M2 by a switch $S_R2$, and the source of $M3_R$ is connected to the source of $M4_R$ by two switches $S_R1$ and $S_R3$.

14. The circuit of claim 13 wherein the internal resistance $R_{int}$ includes an array of binary weighted resistors $2^0$R, $2^1$R . . . $2^N$R, each resistor connected to a switch $S_0$, $S_1$ . . . $S_N$, respectively; controlled by the use of a successive approximation algorithm.

15. The circuit of claim 10 wherein the third circuit includes a circuit for generating an accurate internal capacitance $C_{int}$.

16. The circuit of claim 15 wherein the circuit includes four transistors $M1_C$, M2, $M3_C$, and $M4_C$ connected as a constant $C_{int}$ bias circuit: with $M1_C$ and $M4_C$ connected as diodes, the drain of $M1_C$ connected to the drain of $M3_C$, the drain of M2 connected to the drain of $M4_C$, the gate of $M3_C$ connected to the gate of $M4_C$, the source of M2 connected to the external resistor $R_{ext}$, and the source of $M1_I$ connected to $C_{int}$.

17. The circuit of claim 16 wherein the gate of $M1_C$ is connected to the gate of M2 by a switch $S_C2$, and the source of $M3_C$ is connected to the source of $M4_C$ by two switches $S_C1$ and $S_C3$.

18. The circuit of claim 17 wherein the internal capacitance $C_{int}$ includes an array of binary weighted capacitors $2^0$C, $2^1$C . . . $2^N$C, each capacitor connected to a switch $S_{C0}$, $S_{C1}$ . . . $S_{CN}$, respectively; controlled by the use of a successive approximation algorithm controlled by the use of a pulse of a known duration.

19. The circuit of claim 10 wherein the third circuit includes a circuit for generating an accurate drain to source resistance $r_{DS}$ for a transistor M0.

20. The circuit of claim 19 wherein the circuit for generating accurate $r_{DS}$ includes four transistors $M1_R$, M2, $M3_R$, and $M4_R$ connected as a constant $r_{DS}$ bias circuit: with $M1_R$ and $M4_R$ connected as diodes, the drain of $M1_R$ connected to the drain of $M3_R$ the drain of M2 connected to the drain of $M4_R$, the gate of $M3_R$ connected to the gate of $M4_R$, the source of M2 connected to the external resistor $R_{ext}$, and the source of $M1_R$ connected to the drain of M0.

21. The circuit of claim 20 wherein the gate of M0 is controlled by the output of an op-amp K through a low-pass filter C for stability, and the inputs to the op-amp K are the voltages at the source of $M1_r$ and the source of M2.

* * * * *